(12) United States Patent
Skurdal et al.

(10) Patent No.: US 8,064,625 B2
(45) Date of Patent: Nov. 22, 2011

(54) PORTABLE ENTERTAINMENT SYSTEM

(75) Inventors: Andrew Skurdal, Weehawken, NJ (US); Shannon Robert Gaudio, Weehawken, NJ (US)

(73) Assignee: SDI Technologies, Inc., Rahway, NJ (US)

( * ) Notice: Subject to any disclaimer, the term of this patent is extended or adjusted under 35 U.S.C. 154(b) by 1297 days.

(21) Appl. No.: 11/620,547

(22) Filed: Jan. 5, 2007

(65) Prior Publication Data
US 2008/0165997 A1 Jul. 10, 2008

(51) Int. Cl.
*H04R 1/02* (2006.01)
*H04R 9/06* (2006.01)

(52) U.S. Cl. .................. 381/334; 381/389; 248/309.1

(58) Field of Classification Search .............. 381/334, 381/332, 87, 386, 389, 302, 387, 124; 700/94; 248/226.11, 227.4, 230.1, 230.3, 229.1, 229.2, 248/518, 534, 540, 126, 200, 205.01, 689, 248/195, 562, 202.1, 309.1, 311.2, 314; 348/14.05; 341/176, 173; 224/441, 442, 443, 448, 461, 224/456
See application file for complete search history.

(56) References Cited

U.S. PATENT DOCUMENTS

| | | | |
|---|---|---|---|
| 2,455,716 A | 12/1948 | Weiss | |
| 4,756,454 A | 7/1988 | Villanueva et al. | |
| 4,856,364 A | 8/1989 | Dixon | |
| 4,981,243 A | 1/1991 | Rogowski | |
| 5,001,779 A | 3/1991 | Eggert et al. | |
| 5,106,001 A | 4/1992 | Figinski | |
| 5,426,570 A | 6/1995 | Davis | |
| 5,487,524 A * | 1/1996 | Bergetz | 248/613 |
| 5,771,305 A | 6/1998 | Davis | |
| 6,060,982 A | 5/2000 | Holtrop | |
| 6,104,292 A | 8/2000 | Rombom et al. | |
| 6,264,153 B1 | 7/2001 | Ragner et al. | |
| 6,317,036 B1 * | 11/2001 | Popat et al. | 340/432 |
| 6,443,473 B1 | 9/2002 | Lentz | |
| 6,491,194 B2 * | 12/2002 | Marvin | 224/483 |
| 6,854,628 B1 * | 2/2005 | Stehr | 224/413 |
| 2003/0066942 A1 | 4/2003 | Stierheim | |
| 2005/0123148 A1 | 6/2005 | Ohler | |
| 2006/0280045 A1 * | 12/2006 | Ritsher et al. | 369/30.01 |
| 2007/0050061 A1 * | 3/2007 | Klein et al. | 700/94 |
| 2010/0056072 A1 * | 3/2010 | Hua et al. | 455/77 |

OTHER PUBLICATIONS http://www.eekow.com/product.asp?id=5.
http://www.made-in-china.com/showroom/puda88/product-detailDauxiPprtJQR/China-FM-Cola-Bottle-Radio.html.
http://members.aol.com/djadamson2/transn.html.

* cited by examiner

*Primary Examiner* — Vivian Chin
*Assistant Examiner* — Con P Tran
(74) *Attorney, Agent, or Firm* — Leason Ellis LLP

(57) ABSTRACT

A portable entertainment system for use with a vehicle, such as a bicycle, that amplifies a signal from a portable media device docked therein, and includes a substantially cylindrical housing unit having a speaker and a portable media device docking unit, the speaker being communicably coupled with the docking unit and outputting the amplified signal, a remote control unit controlling a level of the amplified signal output by the speaker and controlling functions of the portable media device docked in the docking unit, and an impact resistant suspension mounting bracket stably securing the housing unit to a frame of the vehicle.

19 Claims, 20 Drawing Sheets

FIG. 10A
FIG. 10B
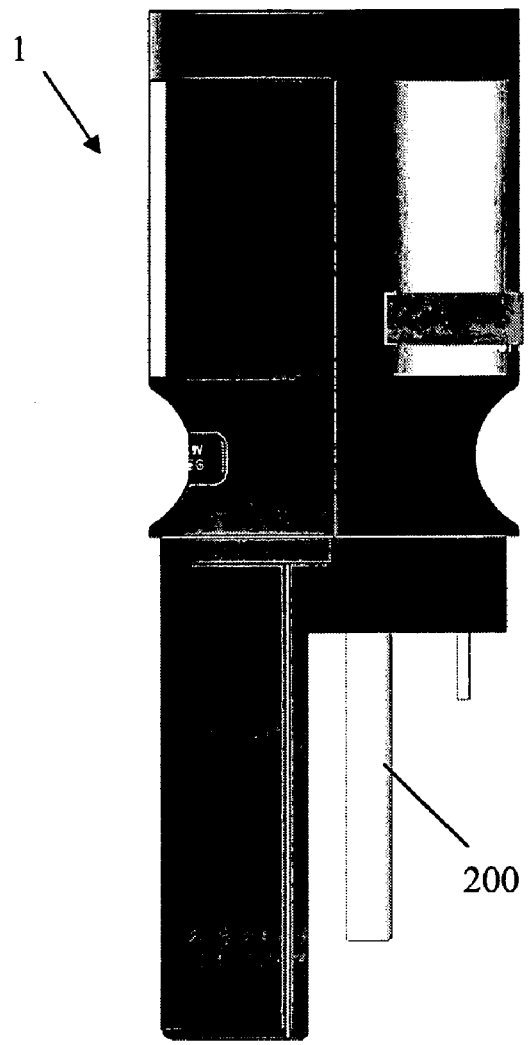
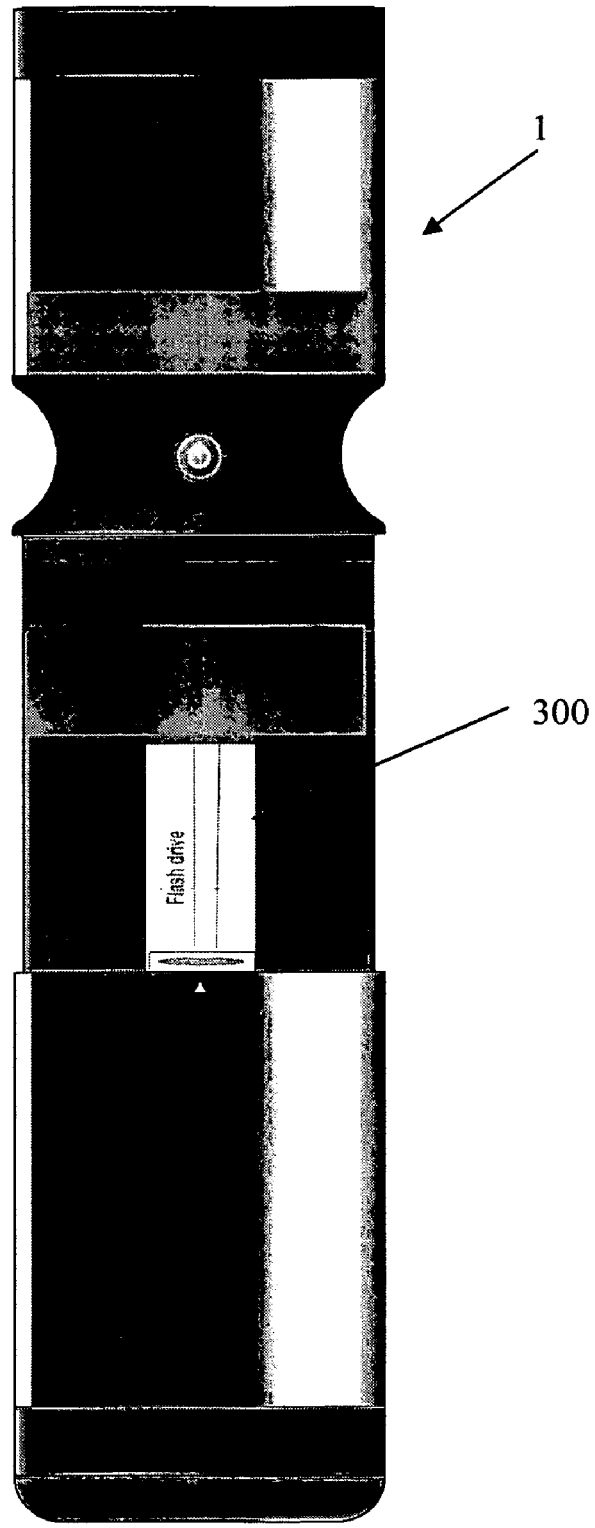

PORTABLE ENTERTAINMENT SYSTEM

BACKGROUND OF THE INVENTION

1. Field of the Invention

The present invention is directed to a portable entertainment system. More particularly, the present invention is directed to a portable entertainment system that is mountable to a structure or frame of a vehicle or conveyor, such as a bicycle.

2. Description of the Related Art

Entertainment systems are used by all types of people under all types of circumstances. Personal entertainment systems, such as battery operated portable radios, cassette and compact disc (CD) players are available and may include one or more speakers or headphones. Units for storing and playing digitally recorded media, such as the IPOD player manufactured by Apple Computer, Inc., are also available and in wide use. Due to their small size and battery operability, personal radios and digital media players can be carried and used when the user is active, such as when riding a bicycle, for example. Some portable compact disc players are designed with memory buffers or other means to provide an anti-shock feature, to prevent skipping when the CD player is bumped or jostled. However, these anti-shock features are often ineffective during high-impact activities, as may sometimes be the case when bicycling.

Although the small size and battery operability of conventional portable entertainment systems renders them attractive, a manner or means for carrying such portable systems while maintaining full operability over the systems, particularly when a user is simultaneously engaged in another activity, has presented several challenges.

Various types of carriers have been designed for carrying portable radios and digital media players. For example, there are body-mountable carriers for holding a portable unit that are designed to be strapped around a body part, e.g., arm, leg or waist, of a user. In addition, some backpacks are provided with a pocket designed specifically for carrying a portable CD player. However, a problem with many such carriers is that access to function controls of the portable unit is frequently obstructed by the carrier.

Moreover, even if the controls are not obstructed, it may be difficult to manipulate the controls due to placement of the portable unit when using such a body-mounted carrier or backpack. In particular, manipulating the controls of a portable radio or digital media player carried in a body-mounted carrier or backpack while bicycling, for example, can be especially difficult, as the controls may not be easily accessed.

Thus, there is a need for a portable entertainment system that is conveniently accessible to use when mounted to a structure or frame of a vehicle or conveyor, such as a bicycle.

SUMMARY OF THE INVENTION

The present invention is directed to a portable entertainment system, which substantially overcomes one or more of the problems due to the limitations and disadvantages of the related art.

It is a feature of an embodiment of the present invention to provide a portable entertainment system capable of being mounted to a structure or frame of a vehicle or conveyor, such as a bicycle, and being conveniently accessible to a user.

It is another feature of an embodiment of the present invention to provide a portable entertainment system that provides convenient access to functions and data on a personal entertainment system.

It is another feature of an embodiment of the present invention to provide a convenient method of using a portable entertainment system while engaged in a variety of activities, such as, for example, bicycling or pushing a stroller.

These and other features and aspects of the present invention may be realized by providing a portable entertainment system that includes a substantially cylindrical housing unit containing at least one speaker and a docking unit for a portable media device. The housing unit amplifies and the speaker outputs a signal produced by the media device docked in the docking unit. The personal entertainment system may further include a remote control unit capable of controlling functions of a media device docked in the docking unit and a speaker of the housing unit. A mounting unit may be provided with the entertainment system for mounting the cylindrical housing unit to a frame or structure of a vehicle. The mounting unit may be dimensioned to allow the cylindrical housing unit to fit securely therein. A mounting assembly may be further provided for mounting the remote control unit, for example, to a frame of a bicycle or stroller. Furthermore, the remote control unit is dimensioned to be removably connectable to an end of the housing unit. Thus, when the system is not in use, the remote control unit may be snapped to an end of the housing unit, thereby reducing the likelihood of losing the remote control unit.

In an embodiment of the present invention, a speaker of the portable entertainment system is provided integrally to the housing unit. In such cases, the speaker may be provided at one end of the housing unit, such that sound produced by the speaker is directed outward of the housing unit. The portable entertainment system may include a protective removable cap removably connectable to the speaker. The removable cap may also be removably connectable to an end of the housing unit opposite the speaker. Thus, when the entertainment system is in use, the removable cap may be removed from the speaker and secured to an opposite end of the housing unit, to reduce the likelihood of losing the removable cap.

In some embodiments of the present invention, the housing unit is formed of at least two portions, which are removably securable to each other. One or more of the housing portions may include a media device holder for receiving a media device. The media device holder may be a recessed or hollow portion formed in a material of the housing unit, or may be provided by a structure formed of one or more appropriate materials within the housing unit. The media device holder may include electrical contacts, e.g., dock connector, for electrically connecting a media device cradled therein to a power supply provided within or external to the housing unit.

According to embodiments of the present invention, means is provided for securely, yet removably, connecting portions of the housing unit together. The means for connecting the portions of the housing unit together may be provided by a slot and lock mechanism, in which one end of one portion of the housing unit is provided with slots into which an end of the other portion of the housing unit is inserted, and then the portions are locked together by rotating a portion of the housing unit. Alternately, threads may be formed in facing ends of the housing portions, such that the housing portions may be screwed together. Alternately, the means for connecting the housing portions may be provided by a rubber sleeve into which facing ends of the housing portions are inserted. The rubber sleeve is proportioned so as to fit tightly around the facing ends of the housing portions, thereby securely holding the housing portions together. Any other suitable means for securely connecting the housing portions together may include, but are not limited to, for example, clamps, screws, adhesives, suction, and friction. A watertight gasket is provided between the housing portions to render the housing unit water-resistant. The housing portions are removably connected to allow access to, and insertion and removal of, a media device to and from the media device holder and batteries to and from a battery compartment provided within the housing unit for powering the housing. When securely connected together, the housing portions and media device holder provide a protective case in which the media device is secured.

In some embodiments of the present invention, the housing unit is substantially cylindrical. Moreover, in some embodiments of the present invention, the housing unit is provided with removable inserts for adjusting a size of the media device holder to accommodate media devices of different sizes.

It should be noted that similar or like parts of all embodiments of the present invention may be interchanged without exception.

By the present invention, a user is able to utilize the entertainment system while operating a vehicle or conveyor, such as, for example, a bicycle or stroller. Moreover, by the remote control unit for controlling a media device and the mounting unit for mounting the remote control unit of the present invention, a user is able to access all functions of the media device without the need to search for function buttons that are out of reach or obscured by an apparatus for carrying a media device. Thus, for example, the full functionality of a media player is available to a user while bicycling or pushing a stroller.

Many different materials known in the art can be used in the production of the housing unit. For example, acrylonitrile butadiene styrene (ABS) or other thermoplastics or resins can be used to form the outer hull and some interior portions of the housing, while rubber and/or other elastic or adhesive material can be used to secure the media player within the housing unit and portions of the housing unit together. Insulative material can be provided within the housing unit to protect the media device, speakers, and other components of the entertainment system.

An additional feature of the present invention is that the housing unit serves to physically protect the media device by absorbing much of the shock that might otherwise damage the media device. Furthermore, the housing unit and the remote control unit are constructed to be water-resistant.

Thus, by the present invention, a portable entertainment system for use with a vehicle, such as a bicycle, amplifies a signal from a portable media device docked therein, and includes a substantially cylindrical housing unit having a speaker and a portable media device docking unit, the speaker being communicably coupled with the docking unit and outputting the amplified signal, a remote control unit controlling a level of the amplified signal output by the speaker and controlling functions of the portable media device docked in the docking unit, and an impact resistant suspension mounting bracket stably securing the housing unit to a frame or structure of the vehicle, thereby providing a robust entertainment system to a user, which is also accessible and convenient to use, for example, while bicycling. It should be noted that similar or like parts of all embodiments of the present invention may be interchanged without exception.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIGS. 10A and 10B illustrate perspective views of entertainment systems accommodating further media devices in accordance with embodiments of the present invention.

DETAILED DESCRIPTION OF THE INVENTION

Figure 1A:
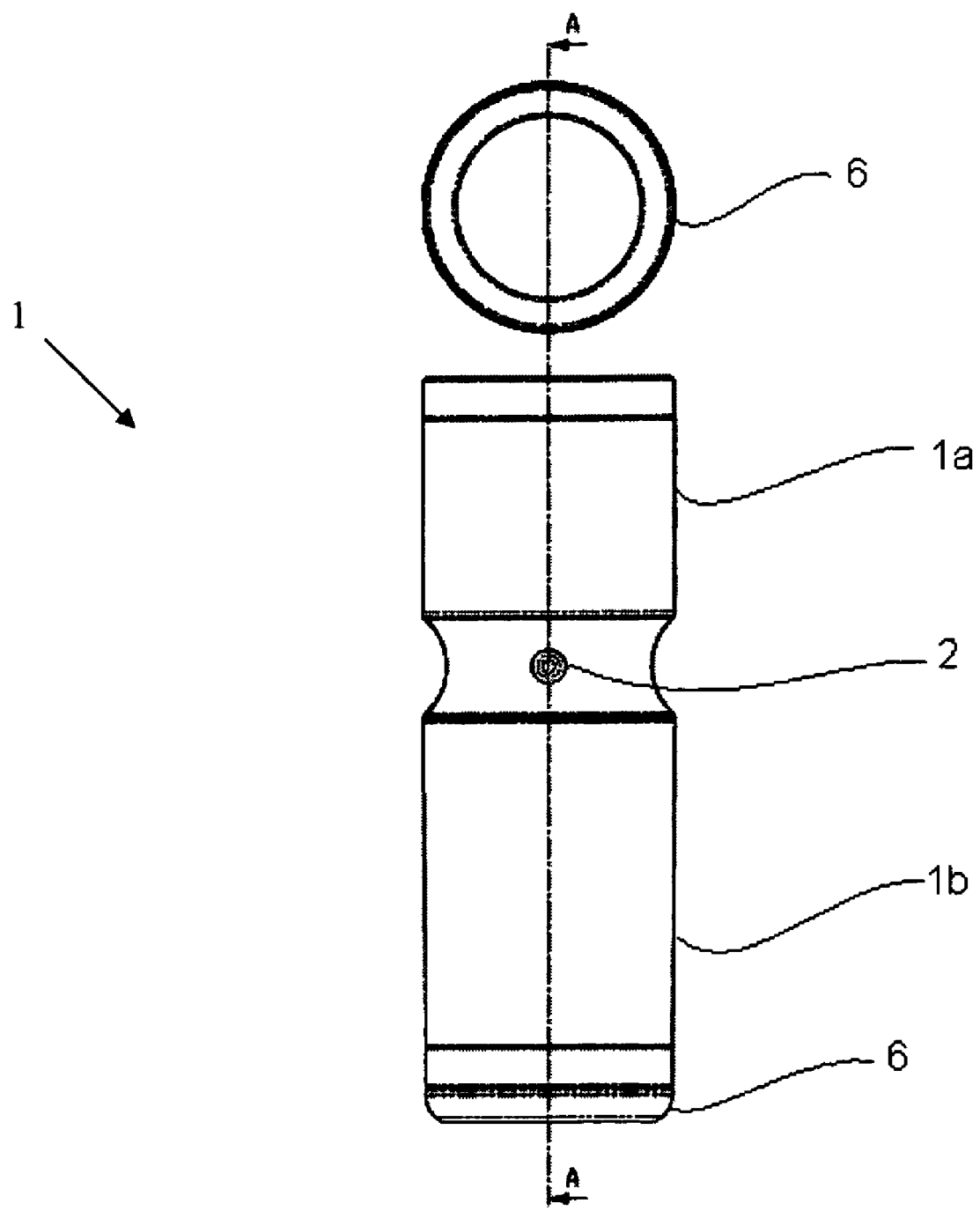
FIGS. 1A-1D illustrate perspective views of an entertainment system according to an embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, like reference characters refer to like elements throughout, and the dimensions of layers and regions may be exaggerated for clarity of illustration.

An exemplary housing unit 1 of a portable entertainment system 100 according to an embodiment of the present invention will now be described with respect to FIGS. 1A-1D, in which are shown perspective views of an exemplary housing unit 1 of an entertainment system 100 and with respect to FIG. 1E, in which is shown a cross-sectional view taken along line A-A of FIG. 1A.

An entertainment system 100 according to an embodiment of the present invention includes an amplifier/housing unit (referred to interchangeably hereinafter as "amplifier," "housing unit" and "unit") 1 that functions as a docking unit with a dock connector 37 (FIG. 1E) and an amplified speaker for a portable media device 8.

Figure 1B:
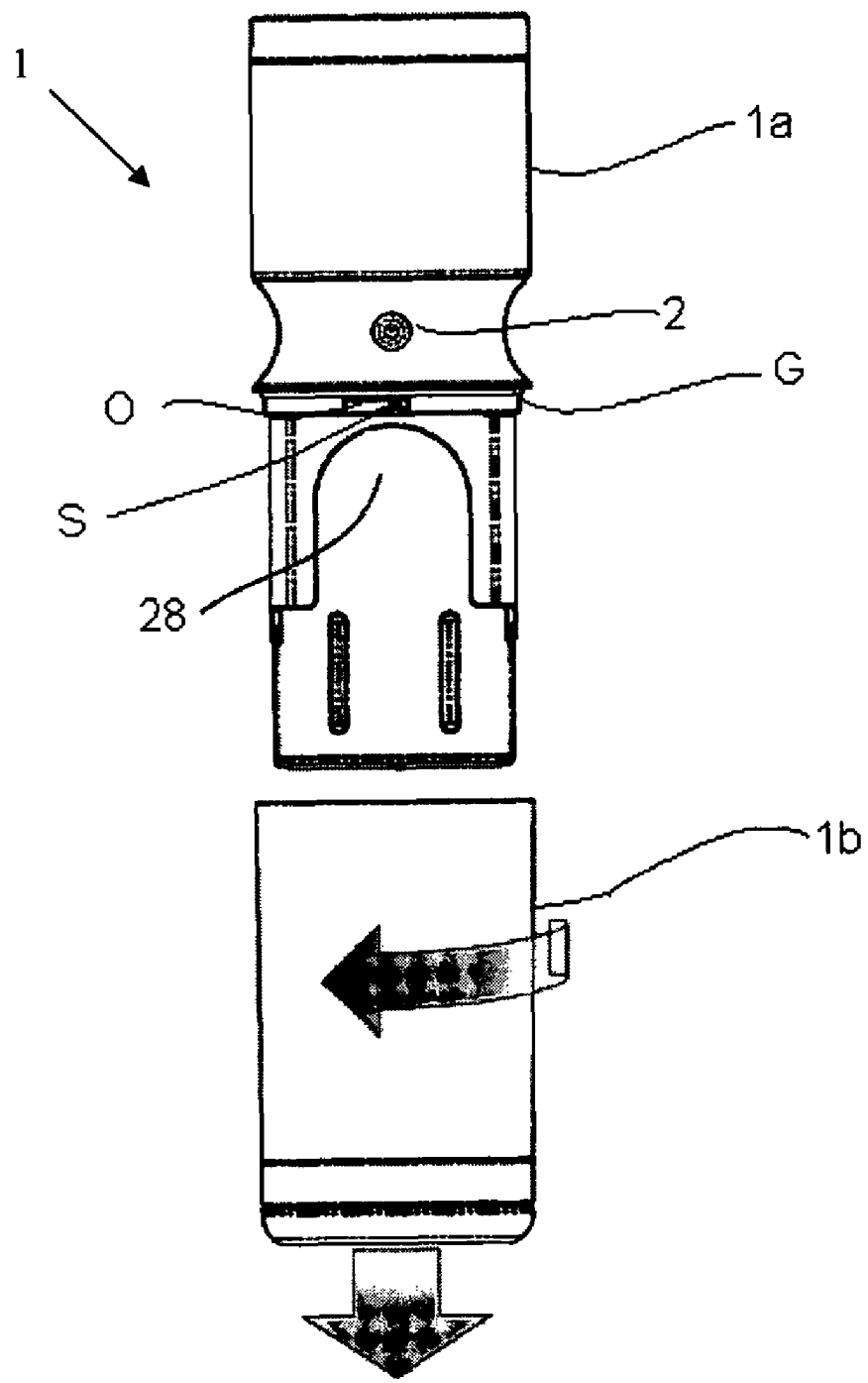
Figure 1C:
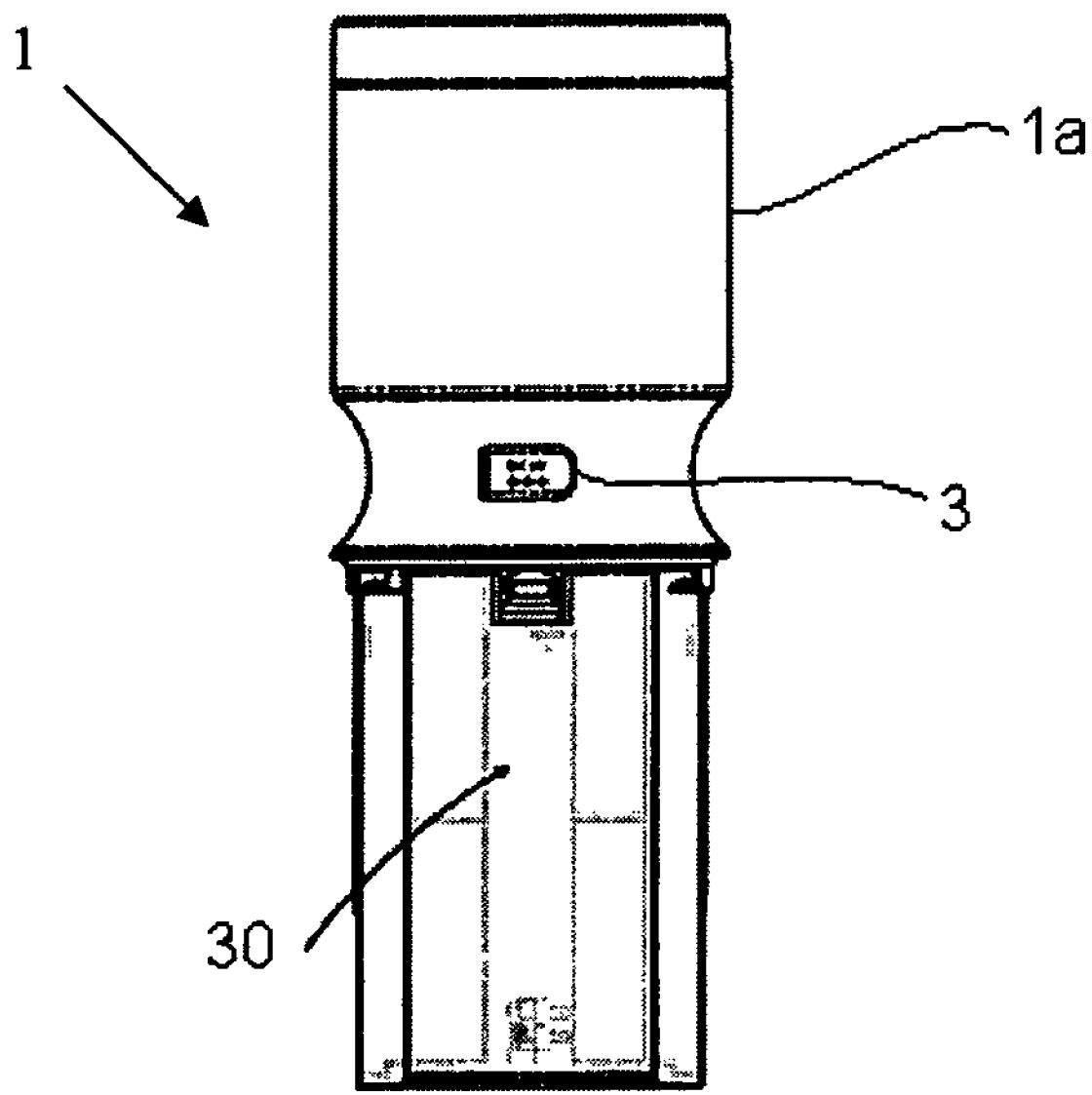
Figure 1D:
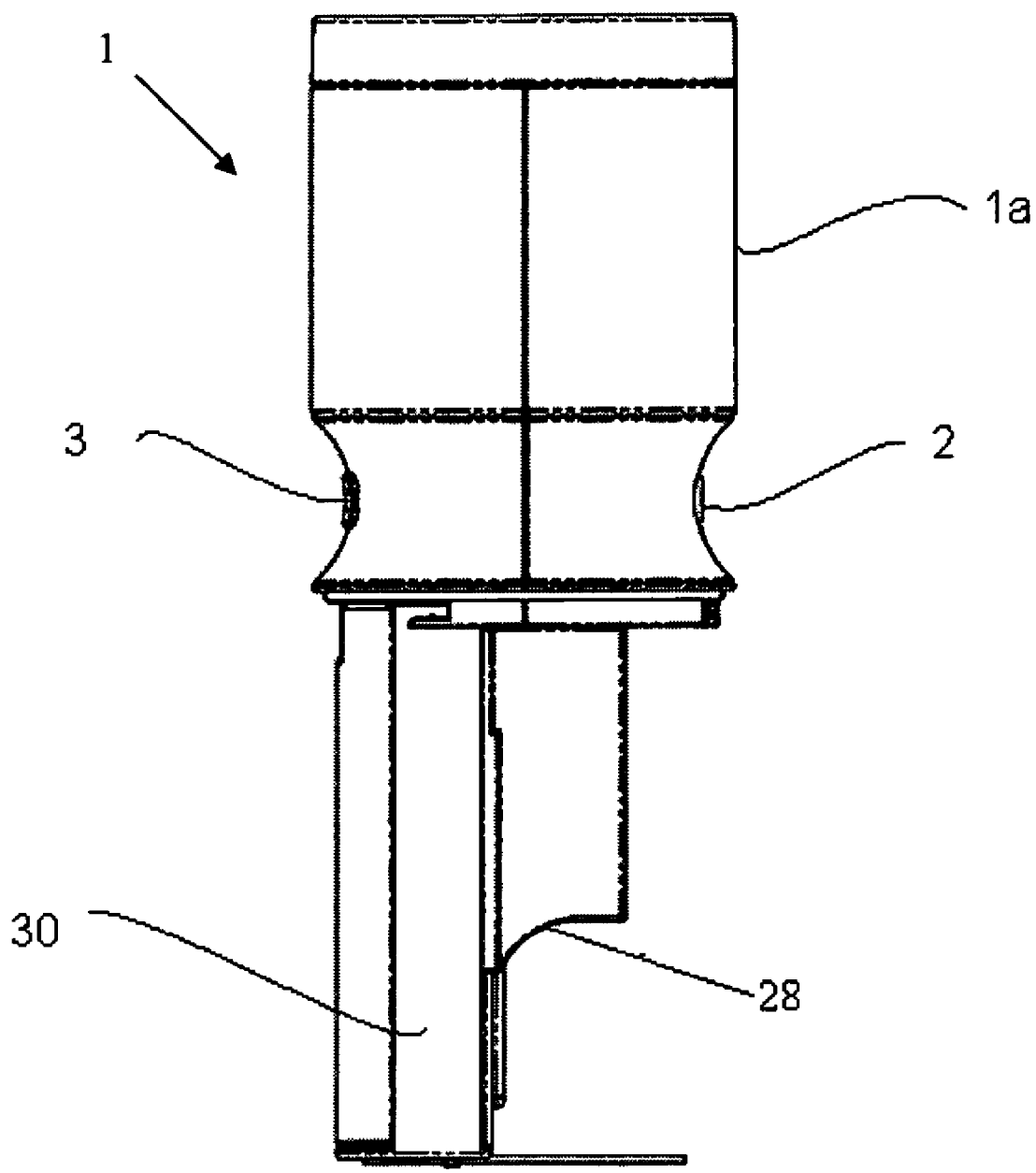
Figure 1E:
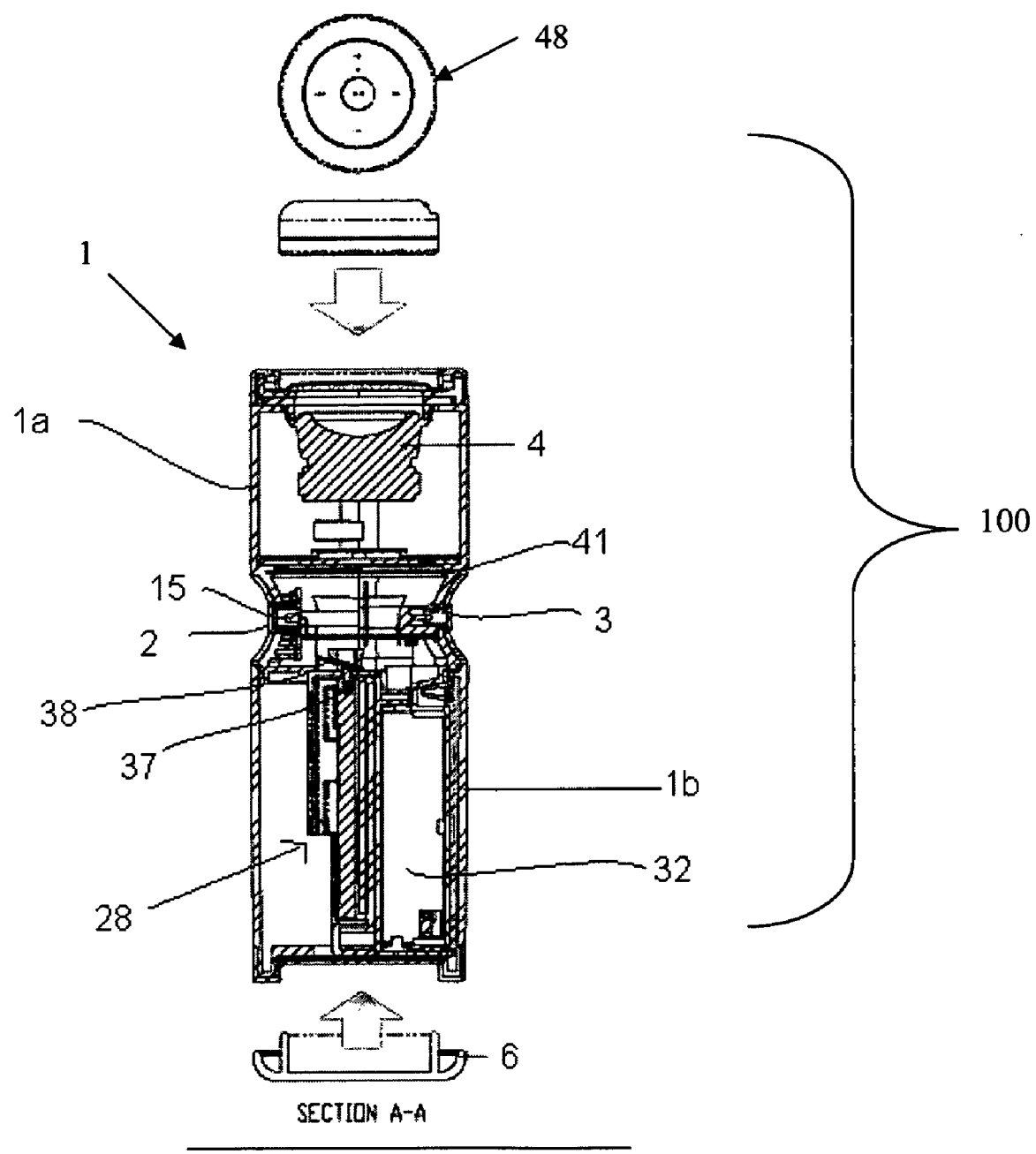
FIG. 1E illustrates a cross-sectional view taken along line A-A of FIG. 1A.

As shown in FIGS. 1A-E, a portable entertainment system 100 of the present invention includes a cylindrical housing unit 1 having a top cylindrical portion 1a and a bottom cylindrical portion 1b. A removable cap 6, which is described more fully with respect to FIG. 1E, is provided on the lower end of the bottom portion 1b of the housing unit 1. However, the removable cap 6 is designed to be attached to either end of the housing unit 1. The top cylindrical portion 1a includes a concave ring at an end thereof facing the bottom cylindrical portion 1b. Midway between a top and bottom of the concave ring of the top cylindrical portion 1a is a power button 2, for turning power on and off to the housing unit 1. The power button 2 may be illuminated by, for example, an LED, when power to the housing unit 1 is turned on.

The bottom cylindrical portion 1b of the housing unit 1 functions primarily as a protective cover and is separable from the top cylindrical portion 1a. In an embodiment of the present invention as shown in FIG. 1B, the top and bottom cylindrical portions 1a, 1b are securely attached by a slot and lock mechanism, in which a protrusion on the bottom cylindrical portion 1b is inserted into an opening O of the top cylindrical portion 1a, and the bottom cylindrical portion 1b is rotated until the protrusion engages with a slot S of the top cylindrical portion 1a. A gasket G is provided between the top and bottom cylindrical portions 1a, 1b. The gasket G provides a shock-absorbing and water-resistant seal between the top and bottom cylindrical portions 1a, 1b. The opening O, slot S and gasket G are shown in FIGS. 1B-1D. The top and bottom cylindrical portions 1a, 1b may be separated by rotating the bottom cylindrical portion 1b counterclockwise and pulling the bottom cylindrical portion 1b away from the top cylindrical portion 1a, as shown in FIG. 1B by directional arrows. Removing the bottom cylindrical portion 1b reveals additional components of the housing unit 1, as shown in FIGS. 1B-1D.

Figure 9A:
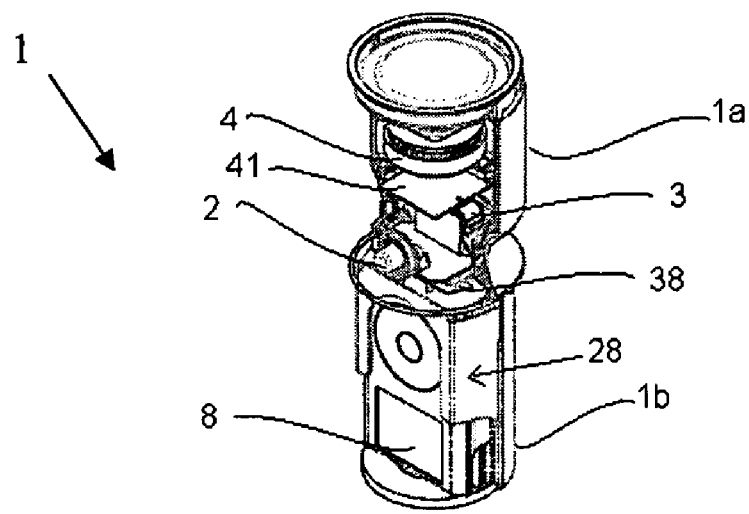
FIGS. 9A and 9B illustrate a cut-away front view and a cut-away back view, respectively, of a top portion and a bottom portion of a housing unit of an entertainment system according to an embodiment of the present invention.
Figure 9B:
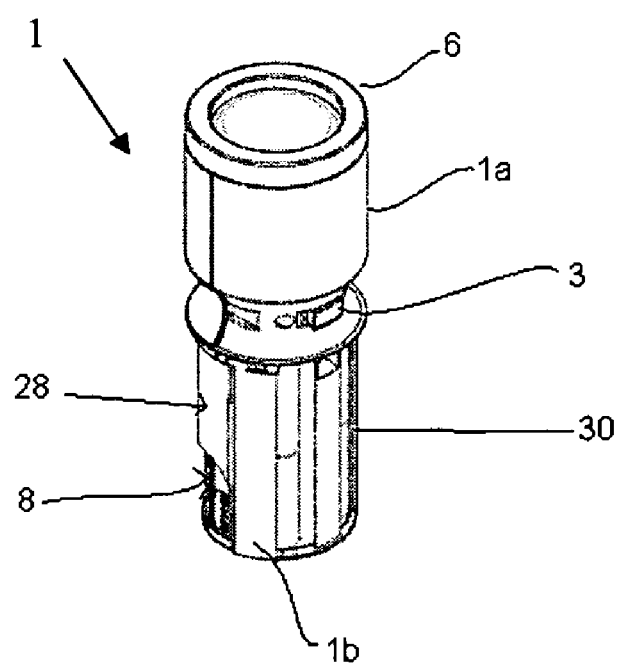

As shown in FIG. 1B, the housing unit 1 includes a portable media device holder or docking unit (referred to interchangeably hereinafter as "media device holder," "media player holder," "docking station" and "docking unit") 28, which includes an opening into which a portable media device (referred to interchangeably hereinafter as "portable media device," "portable media player," "media device" and "media player") 8, such as an IPOD, for example, may be inserted, and walls for holding the portable media player 8 inserted therein (FIGS. 9A and 9B). A dock connector 37 for electrically connecting a portable media player 8 to other components of the housing unit 1 is provided at an interface between the docking unit 28 and an interior of the top cylindrical portion 1a. Electrical components and circuit boards within the housing unit 1 serve to communicatively couple the docking unit 28 and the portable media player 8 docked therein with other components of the housing unit 1, to allow integration between the housing unit 1 and the portable media player 8 docked in the docking unit 28.

FIG. 1C shows an opposite side of the housing unit 1 shown in FIG. 1B without the bottom portion 1b. As shown in FIG. 1C, the housing unit 1 further includes a battery compartment 30 for allowing the unit to be powered by one or more batteries installed therein and which is provided opposite the docking unit 28. Additionally, the housing unit 1 includes a power supply jack 3, which is provided opposite the power button 2 of FIG. 1B, for supplying external power to the housing unit 1 via an AC or DC power supply converter connected to a power supply source. Further, when a portable media player 8 is docked in the docking unit 28 and the housing unit 1 is powered via a power supply, the housing unit 1 may function as a charger so as to charge the battery of the portable media player 8.

FIG. 1D illustrates a side view of the top portion 1a of the housing unit 1 shown in FIGS. 1B and 1C, particularly, showing the docking unit 28, battery compartment 30, power button 2 and power supply jack 3.

FIG. 1E illustrates a cross-sectional view taken along line A-A of FIG. 1A of the entertainment system 100. As shown in FIG. 1E, an amplified speaker 4 is provided within the top cylindrical portion 1a. The speaker 4 is communicatively coupled with the housing unit 1 and docking unit 28 such that a signal provided by a media player 8 docked in the docking unit 28 via a dock connector 37 and a circuit board 38 is converted and amplified in the housing unit 1 to be output as sound by the speaker 4. A RF receiver PCB 41 may be provided in the top cylindrical portion 1a. A LED 32 for illuminating the power button 2 is also shown in FIG. 1E. Additionally as shown by directional arrows, a remote control unit 48 is shown in FIG. 1E that releasably couples to the top portion 1a of the housing unit 1.

The removable cap 6 may be used to cover the speaker 4 when the speaker is not in use. The removable cap 6 may fit securely over the speaker 4 at the top portion of the housing unit 1a as well as over the opposite end of the housing unit 1, i.e., the lower end of the bottom portion 1b of the housing unit 1, as shown in FIG. 1E by directional arrows. Thus, when the entertainment system 100 is in use, the removable cap 6 may be stored on the end of the housing unit opposite the speaker 4 to avoid loss of the removable cap 6. The removable cap 6 is designed to fit snugly on either end of the housing unit 1.

Figure 2A:
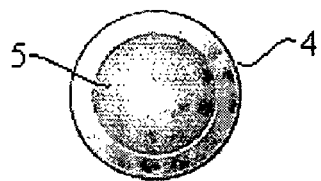
FIG. 2A illustrates a plan view of an exemplary speaker of an entertainment system in accordance with an embodiment of the present invention.
Figure 2B:
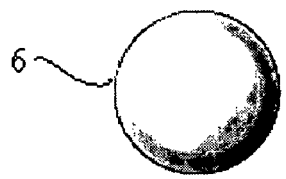
FIGS. 2B and 2C illustrate an exemplary removable cap in accordance with the present invention.
Figure 2C:
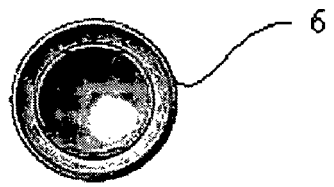

A top view of an example of a speaker 4 having a grill 5 is shown in FIG. 2A, and an exemplary removable cap 6 is shown in FIGS. 2B and 2C with FIG. 2B illustrating a top view of the removable cap 6 and FIG. 2C illustrating a bottom view of the removable cap 6.

By the present invention, when the bottom portion 1b of the housing unit 1 is attached to the top portion 1a via the slot and lock mechanism and with the gasket G provided between the top and bottom portions, the housing unit 1 provides a shock-absorbing, water-resistant container for elements housed therein including a portable media player 8 docked in the docking unit 28. Access to the docking unit 28, and hence, to the portable media player 8 docked therein, and to the battery compartment 30, is provided by removing the bottom cylindrical portion 1b as described above with respect to FIG. 1B.

Figure 3A:
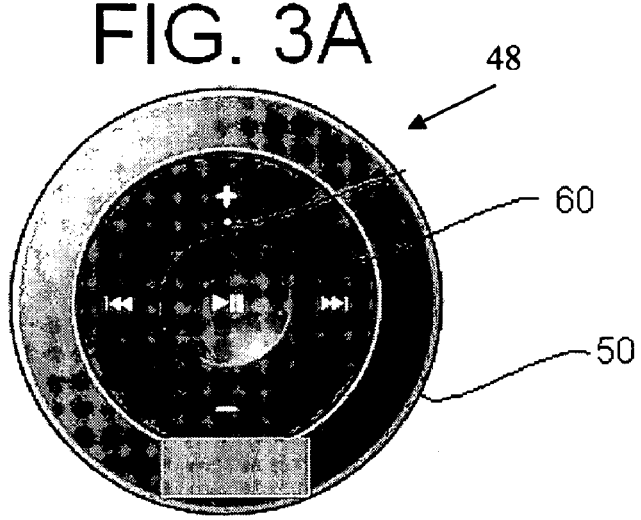
FIGS. 3A-3C illustrate front, rear and side views, respectively, of an exemplary remote control unit according to an embodiment of the present invention.
Figure 3B:
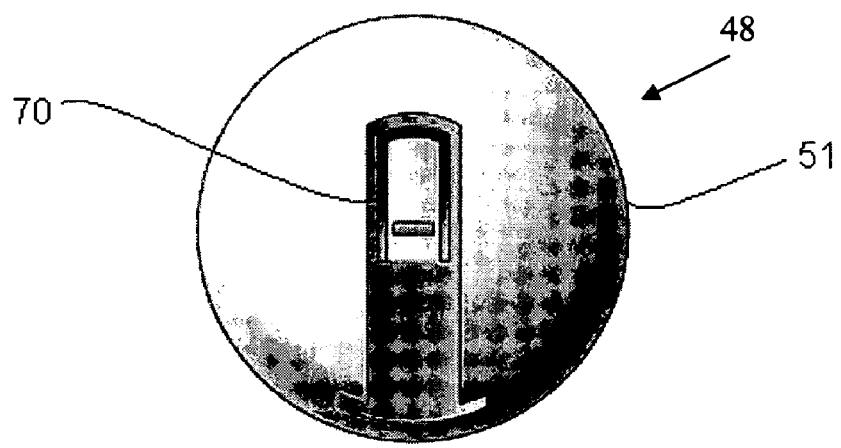
Figure 3C:
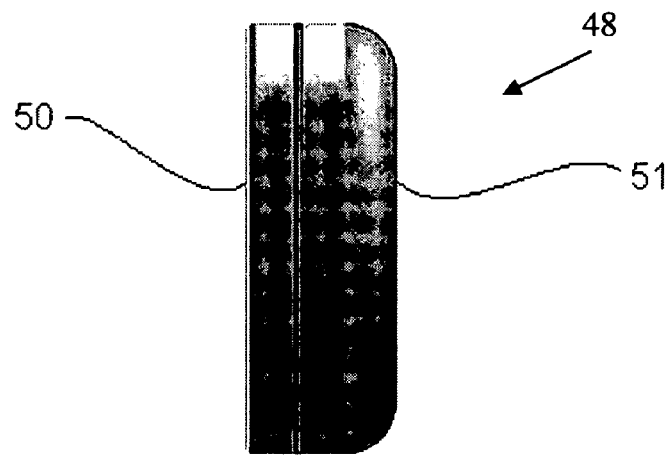
Figure 4A:
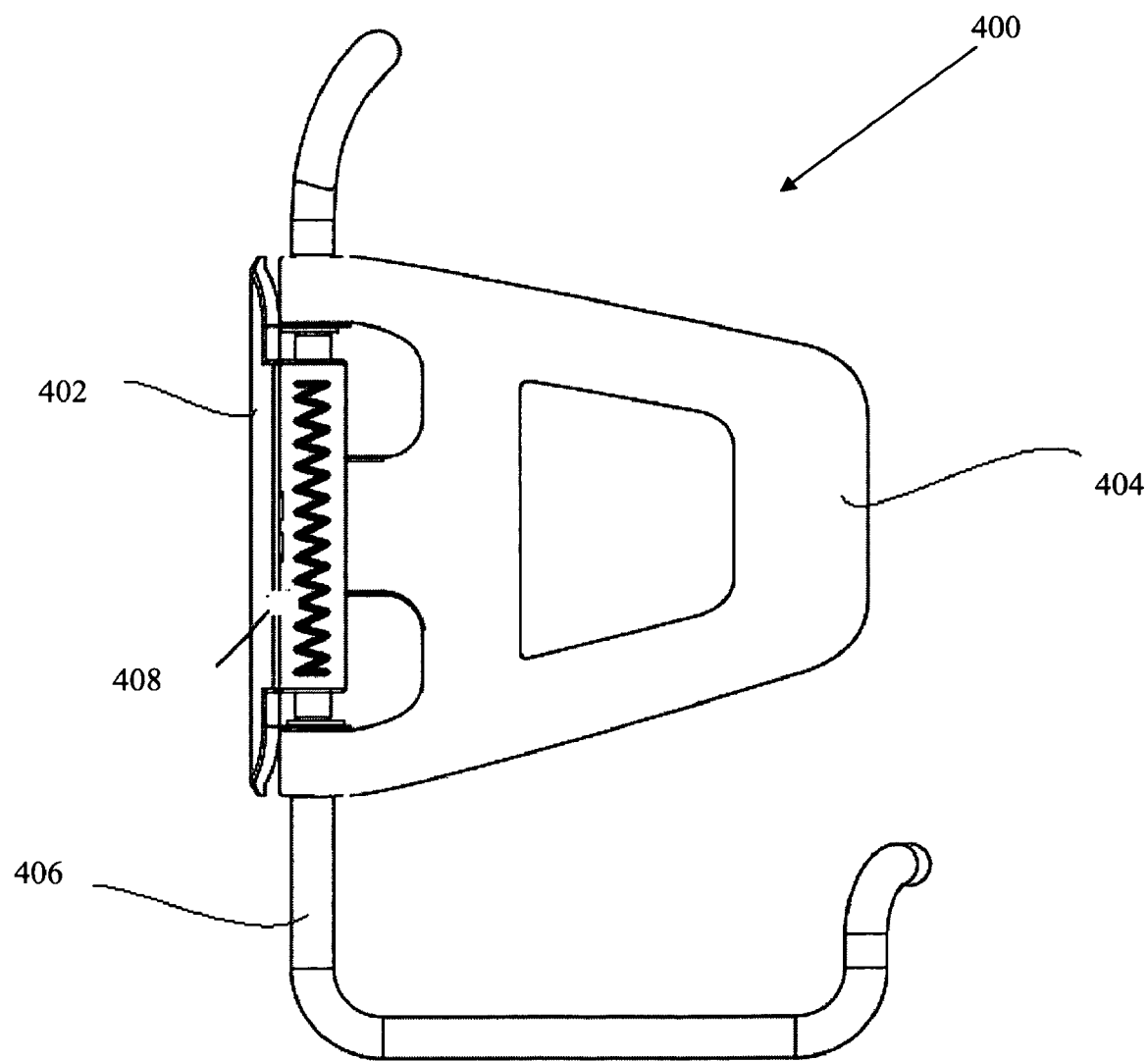
FIG. 4A illustrates a side view of a mounting bracket according to an embodiment of the present invention and FIG. 4B illustrates the same side view of the mounting bracket with up and down arrows indicating the directional motion of the bracket.
Figure 4B:
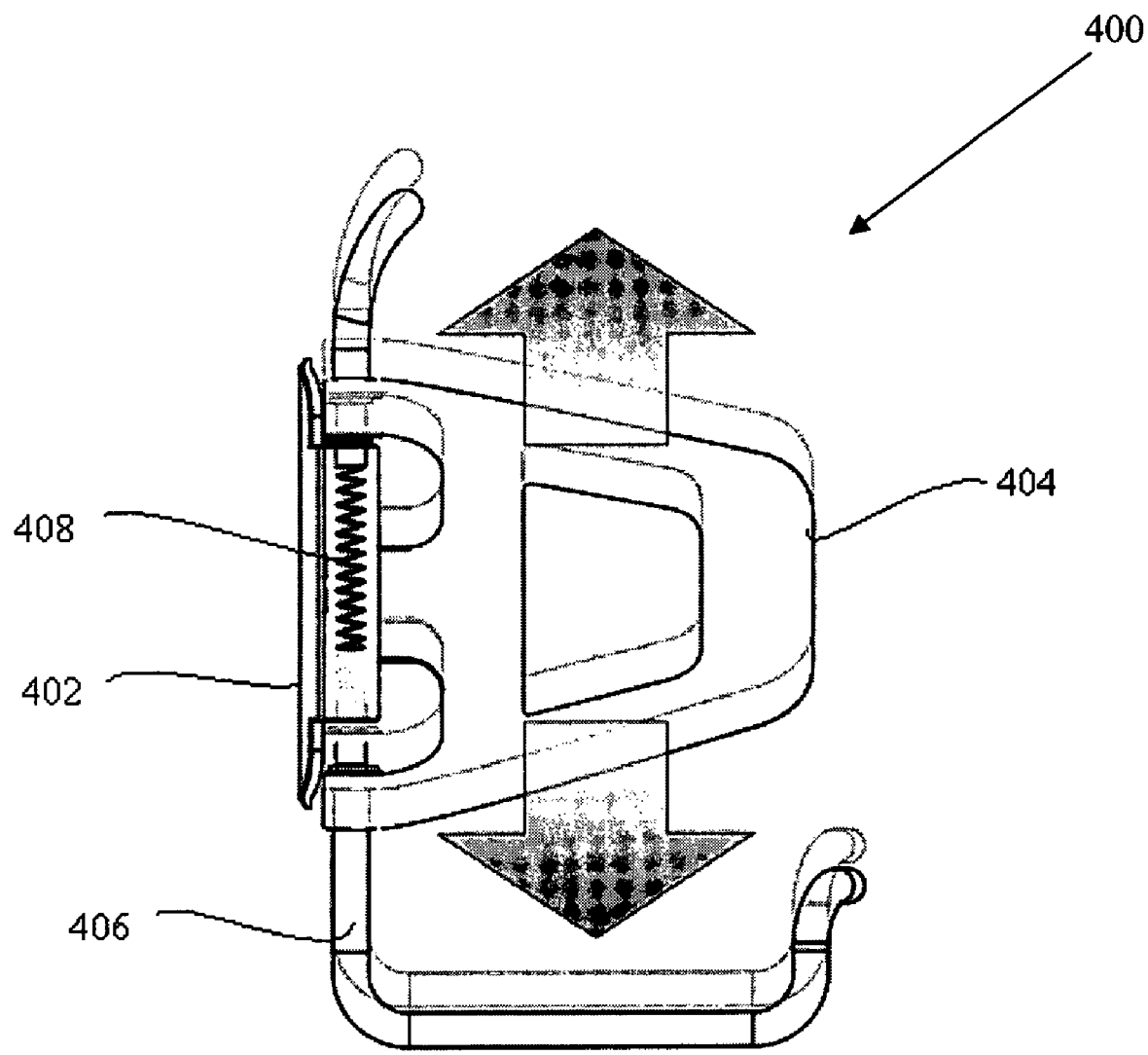
Figure 4C:
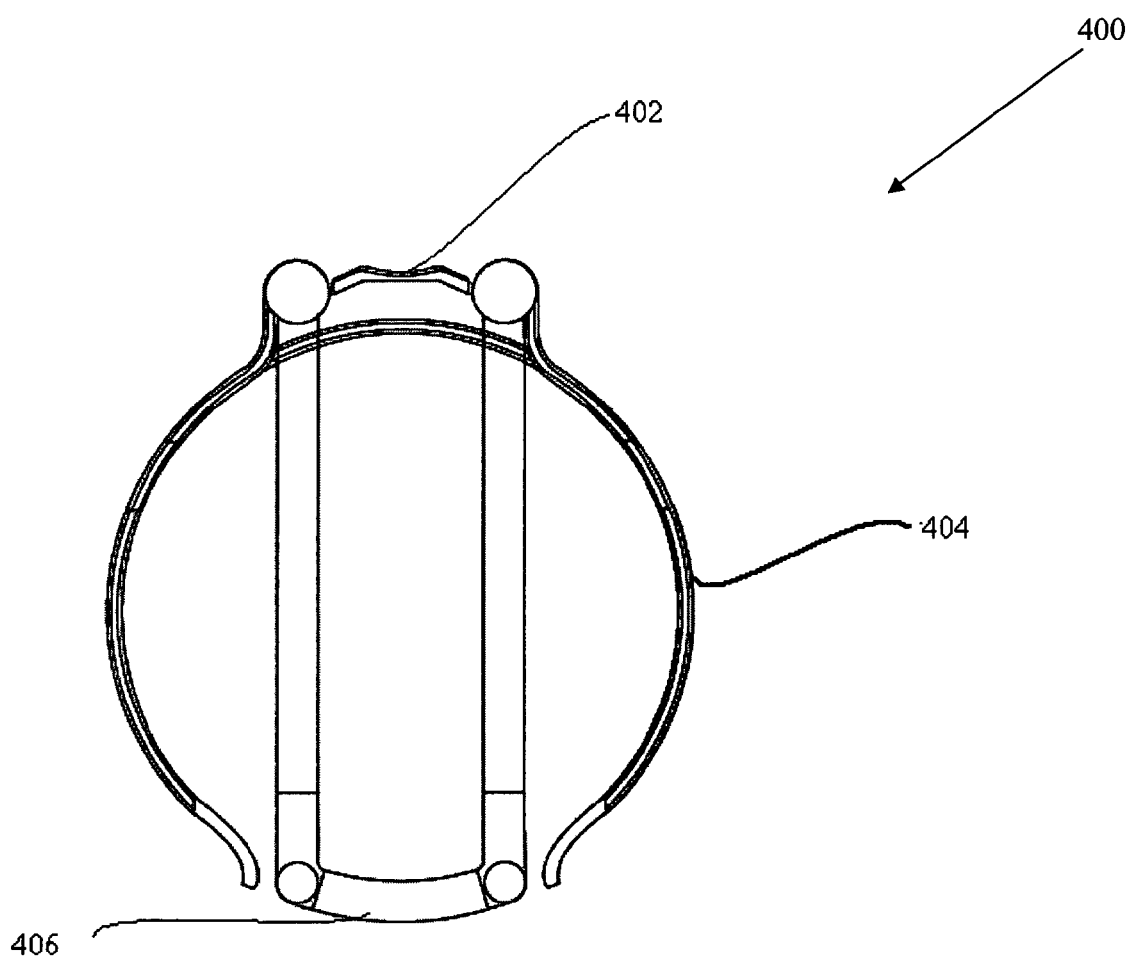
FIGS. 4C and 4D illustrate a top view and a rear view, respectively, of the mounting bracket.
Figure 4D:
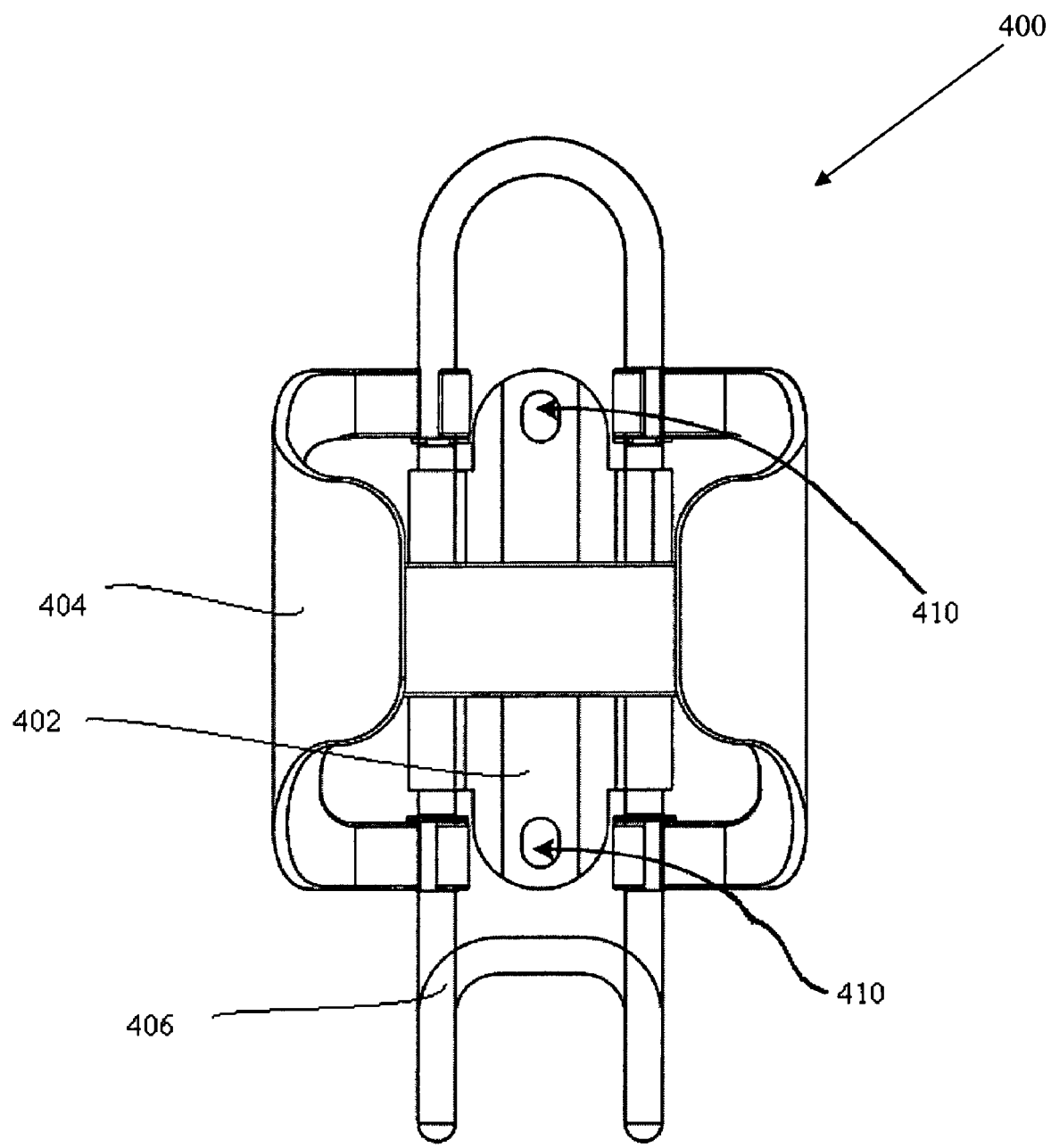

The entertainment system 100 of the present invention further includes, as shown in FIG. 1E and more particularly in FIGS. 3A-3C, an exemplary remote control unit 48 according to an embodiment of the present invention. Particularly, the remote control unit 48 controls functions of a media player 8 docked in the docking unit 28 and controls volume of the output of the speaker 4. The remote control unit 48 is a radio frequency (RF) based unit that communicates with the housing unit 1 via the RF receiver PCB 41 housed in the top cylindrical portion 1a of the housing unit 1 (FIG. 1E). Additional circuitry is provided within the housing unit 1 for allowing communication between the RF receiver PCB 41 and the docking unit 28, in which a media player 8 is docked, and the speaker 4 of the housing unit 1. Moreover, the housing unit 1 and speaker 4 include circuitry for converting and amplifying a signal produced by the media player 8 docked in the docking unit 28 into a signal for driving the speaker 4. Furthermore, the housing unit 1 and speaker 4 include circuitry for allowing a volume level of sound output by the speaker 4 to be controlled via RF signals received by the remote control unit 48.

As illustrated in FIG. 3A, the exemplary remote control unit 48 includes a front cabinet 50 and a rubber pad 60. Markings are provided on the rubber pad 60 for indicating functions performed by pressing the pad 60 in an area of the particular marking. The functions may include, for example, play, pause, stop, search forward, search back, and volume up/down.

As shown in FIG. 3B, the exemplary remote control unit 48 further includes a rear cabinet 51 and a mounting unit 70. FIG. 3C illustrates the front and rear cabinets 50, 51 of the exemplary remote control unit 48. The remote control unit 48 may be battery powered and therefore includes a battery compartment and a battery door (not shown) for inserting and removing one or more batteries. The battery compartment may be provided within the rear cabinet 51 beneath the mounting unit 70.

The remote control unit 48 of the present invention is constructed to be water-resistant. Additionally, although the remote control unit 48 is shown in FIG. 1E as releasably coupling to the top portion 1a of the housing unit 1, like the speaker cover 6, it is configured to fit on either end of the housing unit 1. Thus, when the entertainment system 100 is not in use, the remote control unit 48 may be coupled or attached to either end of the housing unit 1.

By the present invention, by inserting a media player 8 into the docking unit 28 of the housing unit 1, media played by the media player may be amplified and output through the speaker 4 of the housing unit 1, and the media player and volume may be controlled by the remote control unit 48.

The entertainment system 100 of the present invention further includes an impact resistant suspension mounting bracket 400 for mounting the housing unit 1 to a vehicle or conveyor. For example, the mounting bracket 400 may be mounted to a seat tube or a down tube of a bicycle frame in which are located pre-drilled holes for mounting a water bottle rack by a manufacturer of the bicycle.

Particularly, as shown in FIGS. 4A-4D, an exemplary mounting bracket 400 according to an embodiment of the present invention includes a mounting plate 402 having mounting holes 410 for mounting the bracket 400 to a bar, e.g., a seat tube or a down tube, of a frame of a bicycle. The mounting plate 402 may be attached to a bar of a bicycle through the mounting holes 410 by screws or any other suitable means for attaching the mounting plate 402 to a bar of a bicycle. Two L-shaped support brackets 406 are attached to the mounting plate 402 for supporting the housing unit 1. Two retaining brackets 404 for holding the housing unit 1 in place are positioned on the L-shaped support brackets 406 that are attached to the mounting plate 402. Shock-absorbing springs 408 are movably positioned on each support bracket 406 and are located between the top and bottom of each retaining bracket 404. The springs 408 allow for absorbing vibration to the housing unit 1. Based on this configuration, the mounting bracket 400 not only supports the mounting of the housing unit 1 to a vehicle or conveyor but also provides impact resistance suspension thereto.

Additionally, since the housing unit 1 may be sized similar to the size of a water bottle, the housing unit 1 of the entertainment system 100 of the present invention may also be insertable and supported in a standard water bottle rack for a bicycle.

Figure 5A:
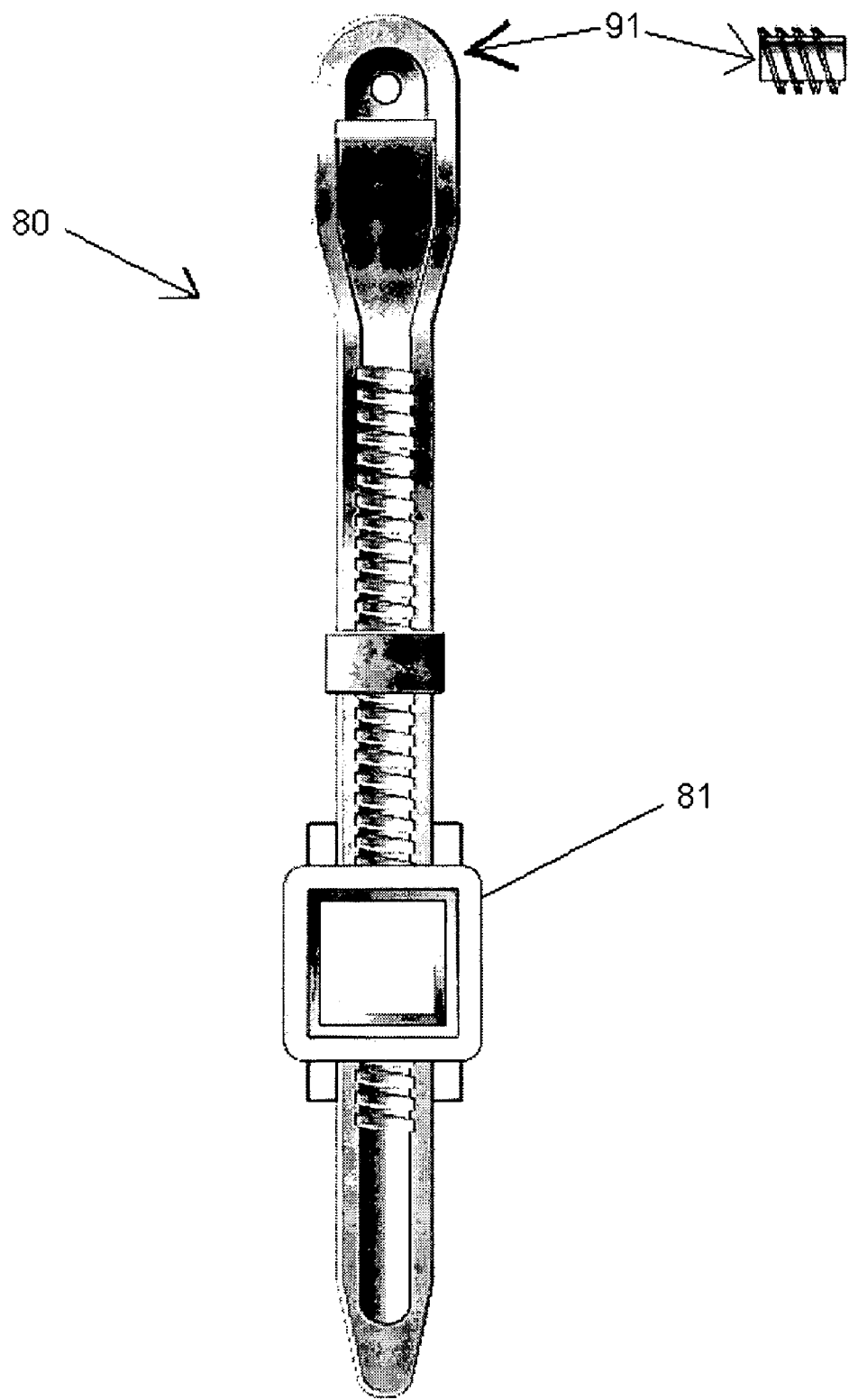
FIGS. 5A and 5B respectively illustrate perspective and side views of an exemplary mounting clamp according to an embodiment of the present invention.
Figure 5B:
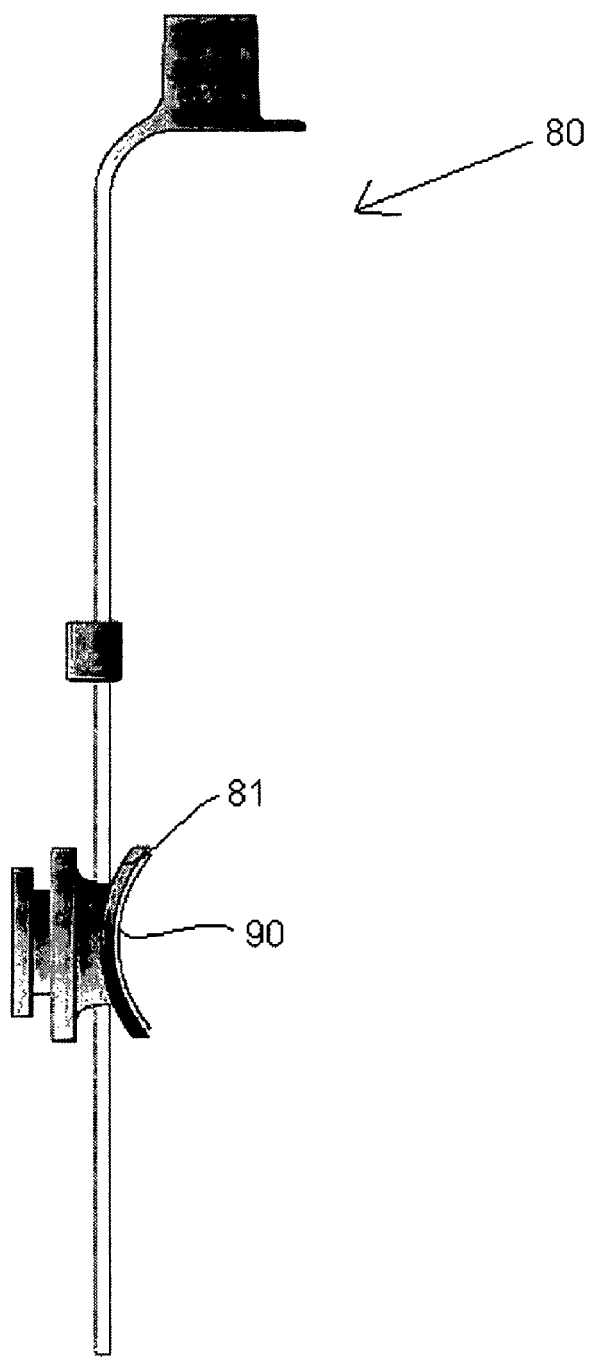

The entertainment system 100 of the present invention further includes a mounting clamp for mounting the remote control unit 48 to a structure or frame of a vehicle or conveyor, such as a bicycle or stroller. FIGS. 5A and 5B illustrate perspective and side views of an exemplary mounting clamp according to an embodiment of the present invention.

Figure 6A:
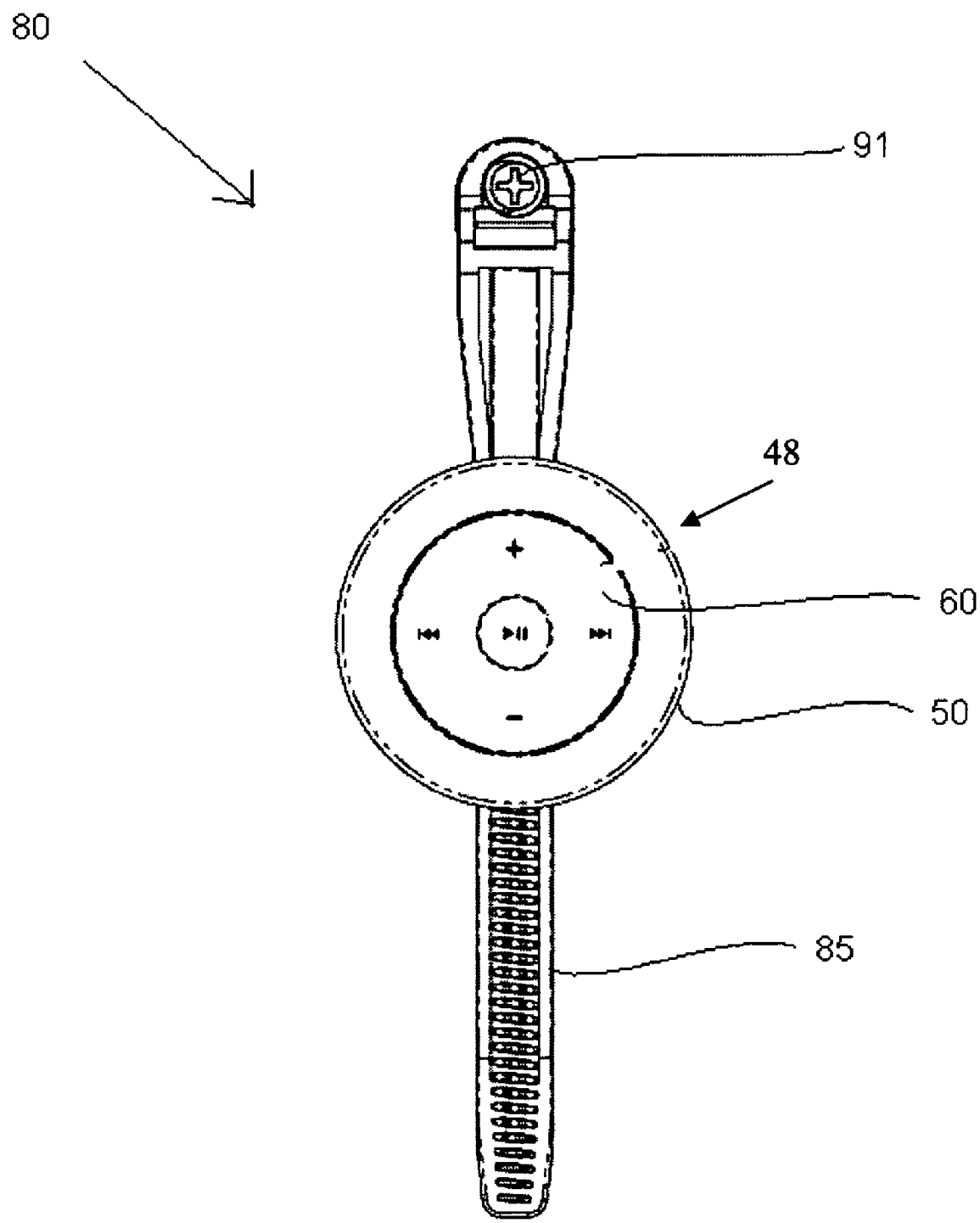
FIGS. 6A-6C illustrate examples of a remote control unit attached to a mounting clamp in accordance with an embodiment of the present invention.
Figure 6B:
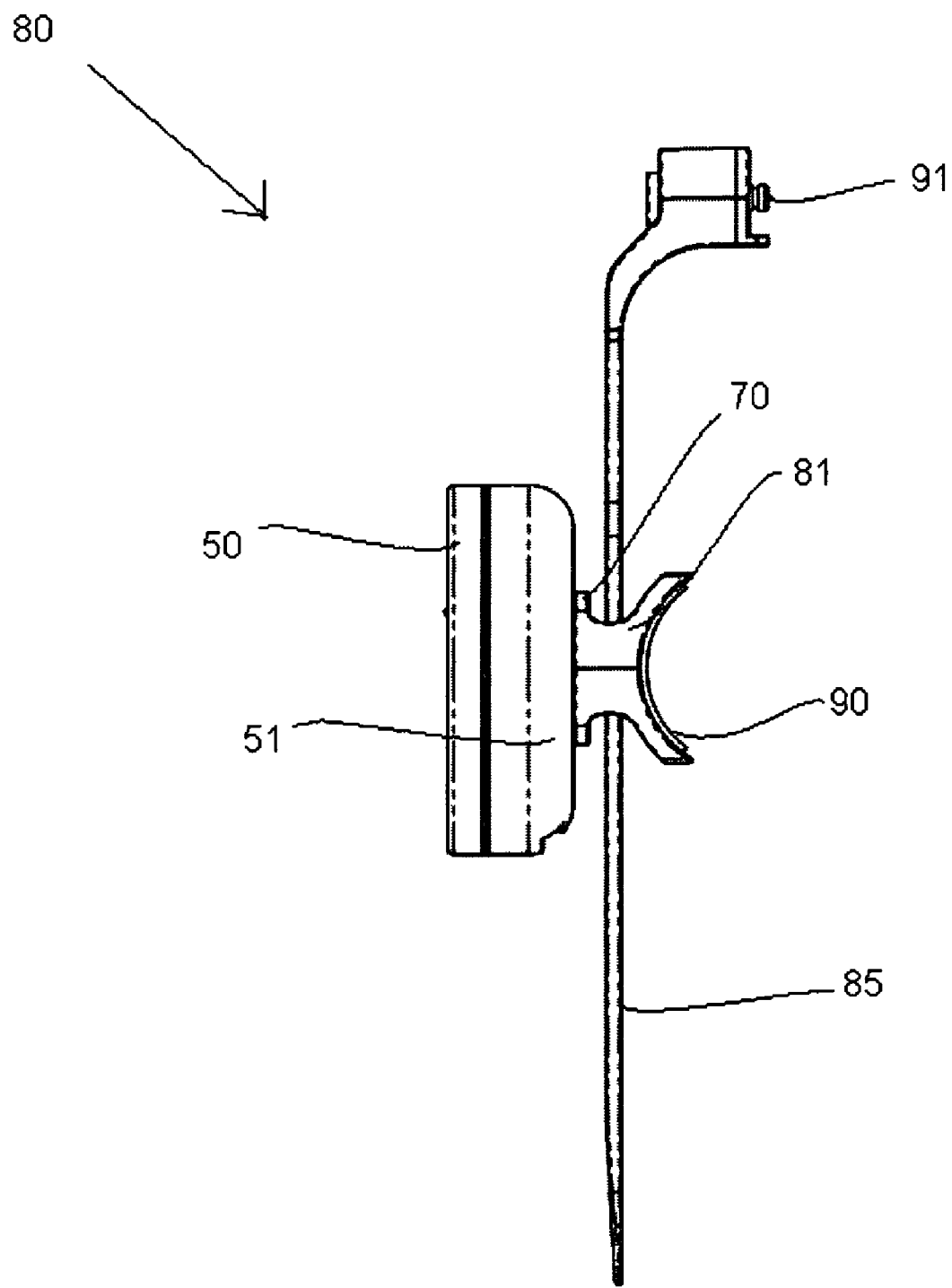
Figure 6C:
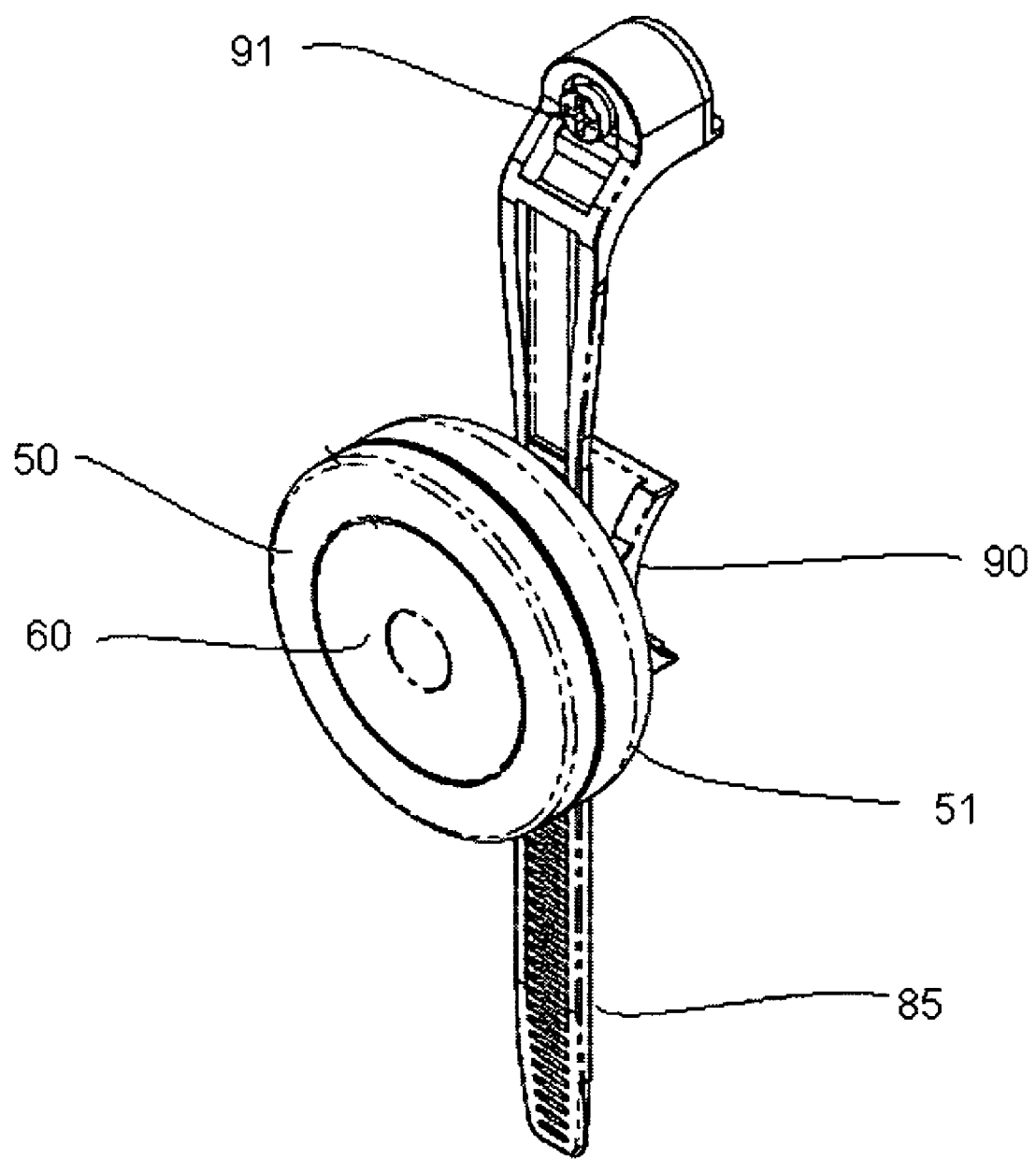
Figures 7A, 7B, 7C, 7D:
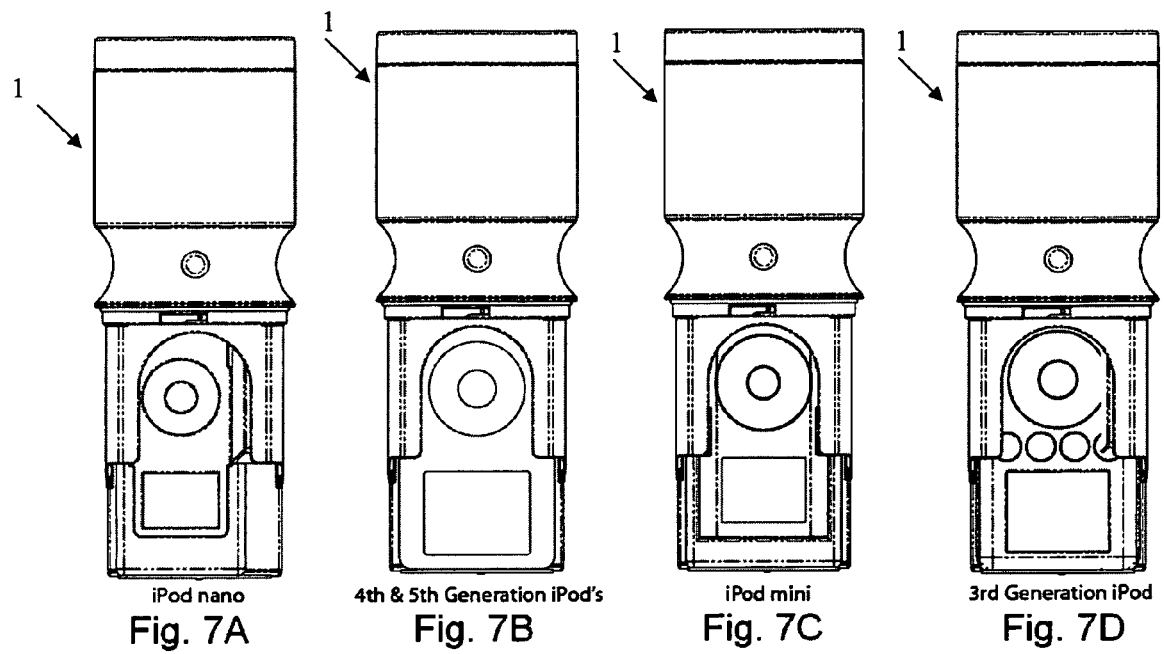
FIGS. 7A-7D illustrate perspective views of entertainment systems accommodating different sized media devices in accordance with embodiments of the present invention.

As shown in FIGS. 5A and 5B, the exemplary mounting clamp 80 includes a clamp snap 81, a clamp belt 85 and a clamp screw 91, for attaching the mounting clamp 80 to a handlebar of a bicycle, for example, thereby providing a user with access to the functions of the portable media player 8 and housing unit 1. The clamp snap 81 has a side that is concave to fit snuggly against a convex handle bar of a bicycle, as shown in FIG. 5B. The concave side of the clamp snap 81 has a clamp rubber pad 90 for providing shock-absorption to the remote control unit 48. As shown in FIGS. 6A-6C, the remote control unit 48 attaches to the clamp snap 81 of the mounting clamp 80 via the mounting unit 70 provided on the rear cabinet 51.

As shown in FIGS. 6A-6C, the remote control unit 48 mounts to the clamp snap 81 of the mounting clamp 80 via the mounting unit 70 provided on the rear cabinet 51 of the remote control unit 48. The clamp belt 85 of the mounting clamp 80 goes through the clamp snap 81. The mounting clamp 80 can then be mounted, for example, to the handlebars of a bicycle to provide a rider with access to the functions of the portable media player.

Although examples of a remote control unit, a mounting clamp for mounting the remote unit and a mounting bracket for supporting the mounting of the housing unit to a vehicle or conveyor according to some embodiments of the present invention have been described with respect to FIGS. 3A-3C, 5A-6C and 4A-4D, respectively, the present invention is not limited to such a remote control unit, mounting clamp, mounting bracket or combination thereof.

Figure 8A:
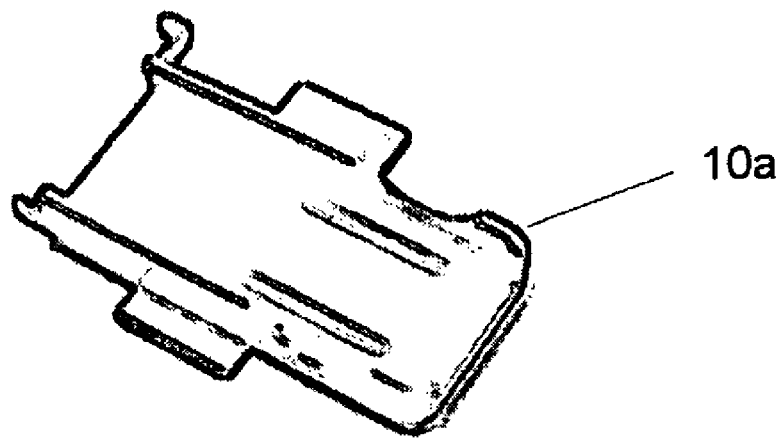
FIGS. 8A-8C illustrate examples of inserts used to secure differently sized media devices within a housing unit of an entertainment system according to an embodiment of the present invention.
Figure 8B:
Figure 8C:
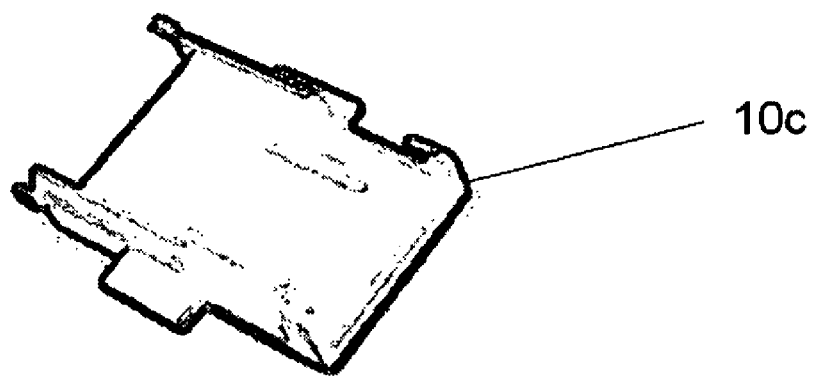

The entertainment system 100 of the present invention may be used with various portable media players and is not limited to only one device. The housing unit 1 of the present invention is capable of securely holding variously sized portable media players by placing various inserts into the end of the housing unit 1 receiving the portable media player. For example, FIGS. 7A-7D illustrate views of a housing unit 1 of the entertainment system 100 according to embodiments of the present invention in which are docked media players of varying sizes. Each of the housing units shown in FIGS. 7A-7D includes a top cylindrical portion 1a and a bottom cylindrical portion 1b that has been removed for illustrative purposes. Thus, a media player docked in the docking unit of each of the housing units is visible. Inserts of different sizes are used to allow a media player docked in the docking unit of each housing unit of FIGS. 7A-7D to fit snugly within the respective docking unit. FIGS. 8A-8C illustrate examples of such inserts (10a-10c) used to secure differently sized media players within the docking unit of the housing unit 1. Rubber bumpers or padding may be used instead of or in addition to the inserts to insulate the various media players in the housing unit 1.

FIG. 9A illustrates a cut-away front view of the housing unit 1 of the entertainment system 100 according to an embodiment of the present invention. Particularly, a side of the top and bottom cylindrical portions 1a and 1b is cut away, revealing the interior of the housing unit 1. Within the top cylindrical portion 1a is shown the speaker 4, RF receiver PCB 41, the power button 2 and the power supply jack 3. In the docking unit 28 within the bottom cylindrical portion 1b is shown an example of a portable media player 8, which may be used with the entertainment system 100 of the present invention. The connector 37 and PCB 38 are provided at an interface between the top and bottom cylindrical portions 1a, 1b, for coupling the media player 8 to the docking unit 28.

FIG. 9B illustrates the housing unit 1 of FIG. 9A from an opposite or backside view of the housing unit 1. FIG. 9B shows the top and bottom cylindrical portions 1a and 1b additionally with the removable cap 6 covering the speaker 4 in the top cylindrical portion 1a. FIG. 9B further shows the power supply jack 3, the docking unit 28, the battery compartment 30 and a media player 8 docked in the docking unit 28.

A method of using the entertainment system 100 according to an embodiment of the present invention will now be described.

A portable media player 8 is inserted into a housing unit 1 of the present invention. If both the unit 1 and the portable media player 8 are powered 'OFF', pressing the power button 2 will turn the unit 1 'ON'. When the unit 1 turns 'ON', the LED 15 turns 'ON', and, if a portable media player 8 is docked, the portable media player 8 will also turn 'ON.' The unit 1 powers on to the 'Play' mode, and to a volume level at which the unit 1 was last used.

If the unit 1 is connected to a power supply, and a portable media player 8 is docked, the unit 1 will charge the portable media player 8 regardless of whether the unit 1 is 'ON' or 'OFF'. If the unit 1 is 'OFF' and charging a docked portable media player 8, the LED 15 will blink to indicate charging.

When the unit 1 is 'ON', pressing the power button 2 again turns the unit 1 'OFF'. When the unit powers 'OFF', a docked portable media player 8 will also turn 'OFF'. The LED 15 will turn off when the unit 1 turns off except when the unit 1 is connected to a power supply and a portable media player 8 is docked. In this case, as noted above, the unit 1 will charge the portable media player 8 and the LED 15 will blink to indicate charging.

The housing unit 1 of the present invention performs an audio detect function by which, if no sound is detected by the housing unit 1 during a predetermined period of time (such as 2 or 3 minutes, for example), the unit will power 'OFF'. When the unit powers 'OFF', the LED turns 'OFF', and if a media player 8 is docked, the media player will also power 'OFF'.

The unit 1 distinguishes between an AC and DC power supply and, when running on batteries, may shut down the unit after a predetermined period of time that is shorter than when the unit is connected to a power supply.

In addition, when running on batteries, the unit will automatically power 'OFF' after another predetermined period of time (such as 2 hours, for example) during which there has been no input, i.e., no button activity, in order to preserve battery life.

The present invention is also not limited to being used with portable media players, as described above, but may also be used with a variety of types of media devices, such as for example, memory devices or flash drives. For example, the entertainment system 100 may be used with a card reader 200 or flash drive 300 according to embodiments as shown in FIGS. 10A and 10B, respectively, and may further include a corresponding dock connector for engaging the card reader or flash drive and a corresponding processor for reading, decoding and converting data stored on the reader or drive along with a housing unit having top and bottom portions, an amplified speaker and docking unit. Particularly, as shown in FIGS. 10A and 10B, portable entertainment systems for use with a card reader or flash drive may include a housing unit having top and bottom portions and a docking unit, similar to the exemplary embodiments as shown in FIGS. 1-9.

A method of playing songs or other types of digital media using the entertainment system 100 of the present invention will now be described. An entertainment system 100 of the present invention is designed, for example, for convenience of use while bicycling. That is, the portable entertainment system 100 of the present invention includes a mounting bracket 400 for securing the housing unit 1, having a media player 8 docked therein, to a frame of a bicycle. Furthermore, a mounting clamp 80 is provided for securely mounting a remote control unit 48, which controls a media player 8 docked in the docking unit 28 and the speaker 4 of the housing unit 1, to handlebars of a bicycle. Thus, by the present invention, a user is able to conveniently enjoy all the features of a portable entertainment system while bicycling.

With both the unit 1 and a docked portable media player 8 powered 'ON', pressing the 'Play/Pause' button on the remote control unit 48 repeatedly will send 'Play/Pause' signals to the portable media player 8. When the unit 1 is 'ON', the LED will remain on in both 'play' and 'pause' modes. Pressing the 'forward' or 'reverse' buttons identified by arrows on the remote control pad 60 will track forward or backward through the media stored on the portable media player 8, respectively. Pressing the 'up' or 'down' arrow button on the remote control pad 60 will adjust the volume level up or down, respectively.

The unit may be designed such that a lowest volume level is above the human threshold of hearing so that it is possible to distinguish between a paused portable media player and a low volume.

Pressing the power button 2 when the unit 1 is 'ON' shuts down the system 100. The system 100 will power back 'ON' (i.e., by pressing the power button when a portable media player is docked and the unit is connected to a power supply) to the last volume level at which the system was used.

By embodiments of the present invention, a user is provided a durable, shock- and water-resistant, portable entertainment system that provides convenient and access to all functions of a portable media player. It should be noted, however, that the invention is not limited to this use and the portable entertainment system may be utilized anywhere and under any practicable conditions.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

For example, in some embodiments of the present invention, a personal entertainment system includes more than one speaker for converting and outputting a signal received from the media device.

In addition, it should be noted that similar or like parts of all embodiments of the present invention may be interchanged without exception.

What is claimed is:

1. A portable entertainment system amplifying a signal from a portable media device insertable therein, the portable entertainment system comprising:
   a substantially cylindrical housing unit comprising a top portion releasably connected to a bottom portion, one of said top and bottom portions housing a speaker and a portable media device docking unit, the speaker being communicably coupled with the docking unit and capable of outputting an amplified signal;
   a mounting bracket for supporting the housing unit and mountable to a frame of a vehicle, wherein the mounting bracket comprises:
      a mounting plate having L-shaped support brackets for mounting the bracket to the frame of the vehicle;
      two retaining brackets for holding the housing unit and positioned on the L-shaped support brackets; and shock-absorbing springs movably positioned on each support bracket and located between a top and bottom of each retaining bracket to allow for absorbing of vibration to the housing unit; and a removable control unit releasably coupled to an end of the housing unit, the control unit for controlling a level of the amplified signal output by the speaker and controlling functions of the portable media device.

2. The portable entertainment system as claimed in claim 1, wherein one of the top and the bottom portions comprises a removably detachable cover.

3. The portable entertainment system as claimed in claim 2, wherein the power unit comprises at least a battery.

4. The portable entertainment system as claimed in claim 1, wherein the housing unit includes a securing mechanism for releasing and securing the top portion and bottom portion together.

5. The portable entertainment system as claimed in claim 1, wherein the housing unit includes a gasket positioned between the top and bottom portions when the portions are connected to provide a shock-absorbent, water resistant seal for the housing unit.

6. The portable entertainment system as claimed in claim 1, further comprising:
a mounting clamp for mounting the control unit to a frame of a vehicle.

7. The portable entertainment system as claimed in claim 1, wherein the housing unit is water resistant.

8. The portable entertainment system as claimed in claim 1, wherein the removable control unit is water resistant.

9. The portable entertainment system as claimed in claim 1, further comprising a power supply connectable to the housing unit for powering the speaker.

10. The portable entertainment system as claimed in claim 9, wherein the power supply comprises at least one of a battery, a DC power source and an AC power source.

11. A portable entertainment system amplifying a signal from a portable media player positionable therein, the portable entertainment system comprising:
a substantially cylindrical housing unit having audio means and a portable media player docking unit positioned within the housing unit, the audio means being communicably connected to the docking unit and capable of outputting an amplified signal;
a remote control unit controlling a level of the amplified signal output by the audio means, controlling operation of a portable media player releasably connectable to the docking unit and mountable to a frame of a vehicle; and
an impact resistant suspension mounting bracket mountable to the frame of the vehicle for supporting and securing the housing unit to the frame, wherein the impact resistant suspension mounting bracket comprises:
a mounting plate having L-shaped support brackets for mounting the bracket to the frame of the vehicle;
two retaining brackets for holding the housing unit and positioned on the L-shaped support brackets; and
shock-absorbing springs movably positioned on each support bracket and located between a top and bottom of each retaining bracket to allow for absorbing of vibration to the housing unit.

12. The portable entertainment system as claimed in claim 11, further comprising a mounting clamp stably securing the remote control unit to the frame of the vehicle.

13. The portable entertainment system as claimed in claim 11, wherein the housing unit includes a top portion for housing the audio means and the docking unit and a bottom portion separately connectable;

a locking mechanism for securely locking and releasing the connectable top and bottom portions; and
a gasket positioned between the top and bottom portions to provide a shock-absorbent, water resistant seal for the housing unit.

14. The portable entertainment system as claimed in claim 13, wherein the bottom portion comprises a cover for covering the docking unit and a power unit located in the housing unit and is removably detachable from the top portion allowing access to the docking unit and the power unit.

15. The portable entertainment system as claimed in claim 14, wherein the power unit comprises at least a battery.

16. The portable entertainment system as claimed in claim 11, further comprising a power supply connectable to the housing unit for powering the audio means.

17. The portable entertainment system as claimed in claim 16, wherein the power supply comprises at least one of a battery, a DC power source and an AC power source.

18. A portable entertainment system comprising:
an amplifier housing unit including a docking unit for docking a portable media player and a speaker coupled to the docking unit capable of amplifying and outputting a signal produced by a portable media player insertable in the docking unit, the amplifier housing unit having a substantially cylindrical shape;
a remote control unit controlling a volume of the signal output by the speaker and operation of the portable media player insertable in the docking unit; and
a mounting bracket mounting the amplifier housing unit to a frame of a vehicle, wherein the mounting bracket comprises:
a mounting plate having L-shaped support brackets for mounting the bracket to the frame of the vehicle;
two retaining brackets for holding the housing unit and positioned on the L-shaped support brackets; and
shock-absorbing springs movably positioned on each support bracket and located between a top and bottom of each retaining bracket to allow for absorbing of vibration to the housing unit.

19. A portable entertainment system removably mountable to a frame of a vehicle, the portable entertainment system comprising:
a cylindrical housing unit having a portable media player docking unit located within the housing unit;
a speaker provided within the housing unit and coupled to the docking unit, the speaker capable of amplifying a signal from a portable media player connectable to the docking unit;
a remote control unit removably mountable to the vehicle frame for controlling operation of the portable media player; and
a shock-absorbing mounting bracket removably mountable to the vehicle frame and for supporting the housing unit when the bracket is secured to the vehicle frame, wherein the shock-absorbing mounting bracket comprises:
a mounting plate having L-shaped support brackets for mounting the bracket to the frame of the vehicle;
two retaining brackets for holding the housing unit and positioned on the L-shaped support brackets; and
shock-absorbing springs movably positioned on each support bracket and located between a top and bottom of each retaining bracket to allow for absorbing of vibration to the housing unit.

* * * * *